P. R. HARSH.
SIGNALING APPARATUS FOR VEHICLES.
APPLICATION FILED MAY 28, 1915.

1,179,306.

Patented Apr. 11, 1916.
2 SHEETS—SHEET 1.

Witnesses
C. F. Rudolph
John J. McCarthy

Inventor
Paul R. Harsh,
By Victor J. Evans
Attorney

P. R. HARSH.
SIGNALING APPARATUS FOR VEHICLES.
APPLICATION FILED MAY 28, 1915.

1,179,306.

Patented Apr. 11, 1916.
2 SHEETS—SHEET 2.

Witnesses
O. F. Rudolph
John J. McCarthy

Inventor
Paul R. Harsh,
By Victor J. Evans
Attorney

UNITED STATES PATENT OFFICE.

PAUL R. HARSH, OF TOLEDO, OHIO.

SIGNALING APPARATUS FOR VEHICLES.

1,179,306.  Specification of Letters Patent.  Patented Apr. 11, 1916.

Application filed May 28, 1915. Serial No. 31,031.

*To all whom it may concern:*

Be it known that I, PAUL R. HARSH, a citizen of the United States, residing at Toledo, in the county of Lucas and State of Ohio, have invented new and useful Improvements in Signaling Apparatus for Vehicles, of which the following is a specification.

This invention relates to improvements in signal apparatus for vehicles and has particular application to a direction indicator for motor vehicles.

In carrying out the present invention it is my purpose to provide a direction indicator for vehicles whereby the driver of the vehicle may notify pedestrians and the drivers of other vehicles in advance of and behind his vehicle of the manner in which he is about to control his vehicle, thereby eliminating confusion at curbs, crossing points and the like and enabling the vehicles to be operated with comparative safety.

It is also my purpose to provide a direction indicator wherein the indicating signals at the forward and rear ends of the vehicle will be automatically energized or actuated by the turning of the steering wheel of the vehicle and wherein the signals at the forward and rear ends of the vehicle may be operated both manually and automatically.

A further object of my invention is to improve and simplify the general construction of direction indicating apparatus for motor vehicles and to provide a simple and inexpensive form of switch for controlling the signals from the steering post of the vehicle so that such signals will be actuated in accordance with the operation of the steering.

With the above recited objects in view and others of a similar nature the invention consists in the construction, combination and arrangement of parts hereinafter set forth in and falling within the scope of the claim.

Figure 1:
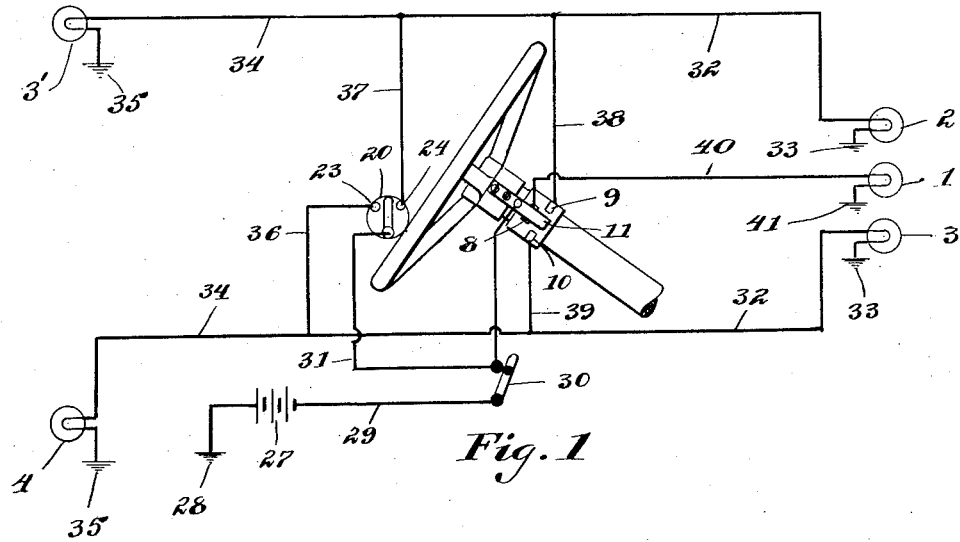
Figure 2:
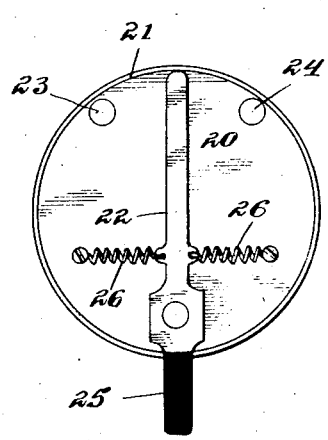
Figure 3:
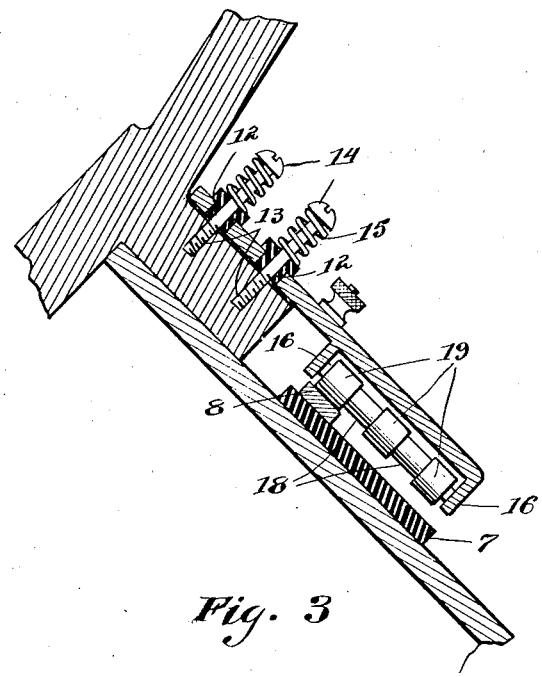
Figure 4:
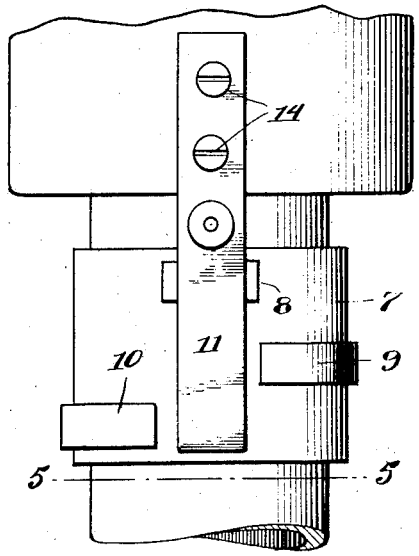
Figure 5:
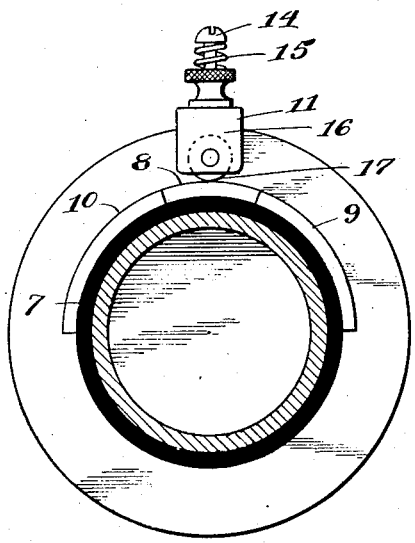
Figure 6:
Figure 7:
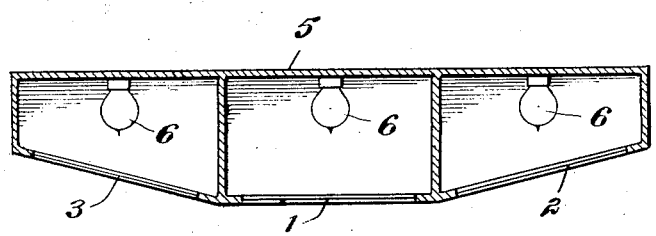

In the accompanying drawing: Figure 1 is a diagrammatic view of a direction indicating apparatus constructed in accordance with my present invention. Fig. 2 is a top plan view of the hand operated switch. Fig. 3 is a fragmentary longitudinal sectional view through the steering column showing the automatic switch. Fig. 4 is a plan view of the automatic switch, parts being shown in section. Fig. 5 is a cross sectional view through the steering column and switch associated therewith. Fig. 6 is a view in elevation of one of the signal devices. Fig. 7 is a longitudinal sectional view therethrough.

Referring now to the drawings in detail the numerals 1, 2 and 3 indicate signal devices located at the forward end of the vehicle and disposed at the center and at the left and right of the center, respectively, of such vehicle, while 3' and 4 indicate signal devices carried by the rear end of the vehicle and disposed at the left and right, respectively, of the longitudinal center line of the vehicle. In the present instance each signaling device comprises a casing 5 having the front wall thereof provided with suitable indicia and the inner surface of the rear wall equipped with a lamp receptacle 6 adapted to carry an electric lamp bulb, and the side walls thereof formed to provide reflecting surfaces adapted to project the light rays through the front wall of the casing when the lamp is energized. In this case the signal device 2 at the forward end of the vehicle has the word "Left" inscribed thereon while the front walls of the devices 1 and 3 have the words "Ahead" and "Right", respectively inscribed thereon. Similarly, the front walls of the signal devices 3' and 4 at the rear end of the vehicle have the words "Left" and "Right" inscribed thereon, respectively.

The steering wheel of the motor vehicle controls a switch and, in the present instance, this switch comprises a sleeve 7 of insulating material surrounding the stationary tubular member of the steering column and appropriately fastened thereto, the sleeve 7 being disposed immediately below the hub of the steering wheel. Fastened to the sleeve 7 of insulating material adjacent to the upper end thereof is a contact segment 8, while disposed below the segment 8 and arranged at one side thereof is a second contact segment 9. 10 indicates another contact segment disposed below the segment 9 and arranged at the end of the segment 8 opposite from the segment 9. A contact arm 11 is carried by the hub of the steering wheel and projects downwardly therefrom and overlies the sleeve 7, as clearly illustrated in Figs. 3 and 4 of the drawings. In the present instance, the upper end portion of the arm 11 is formed with openings 12 that aline with openings 13 formed in the adjacent portion of the hub of the steering wheel and passed through these alining openings are headed bolts 14 and interposed between the heads of the bolts 14 and the outer face of the arm 11 are coiled expansion springs 15 acting to hold the arm 11 in normal position, the inner ends of the bolts 14 being threaded into the openings 13 in the hub of the steering wheel. Secured to the inner surface of the arm 11 and spaced apart longitudinally thereof and projecting toward the sleeve 7 are axially alining bearings 16 in which is journaled a shaft 17. Mounted upon the shaft 17 and spaced apart thereon by means of washers 18 are contact rollers 19 corresponding to the plates or segments 8, 9 and 10 and adapted to engage such segments, respectively, as the steering wheel is moved from one position to another.

20 designates a manually controlled switch located upon the steering wheel within convenient reach of the operator and suitably secured to such wheel. In this instance the manually operable switch 20 comprises a base 21, a switch blade 22 pivoted upon the base between its ends and capable of swinging movement, and contact studs 23, 24 secured to the base 20 at opposite sides of the switch lever 22 adjacent to one end of said lever and disposed in the path of movement of such end of the lever so as to be engaged thereby, according to the movements of the lever. The remaining end of the lever 22 is equipped with a handle 25 whereby such lever may be swung. This handle is preferably formed of insulating material. Springs 26 have the outer ends thereof fastened to the upper surface of the base 20 and the inner ends secured to the lever 22 at the opposite edges of such lever and these springs act to hold the lever in normal position between the studs 23 and 24.

Mounted upon the motor vehicle is a source of electrical energy such, for instance, as a storage battery 27 and one side of the battery 27 is grounded upon the frame of the vehicle as at 28 while leading from the remaining terminal thereof is a conductor 29 terminally connected with one side of a hand operated main controlling switch 30 mounted upon the dashboard of the vehicle, and from the remaining side of the switch 30 lead wire 31, 32 terminally connected with the lever 22 and arm 11 of the manually operated and automatically operated switches, respectively. Corresponding terminals of the lamp receptacles of the signal devices 2 and 3' are connected to each other by means of a conductor 32, and the remaining terminals of the lamp receptacle of said signal devices are grounded as at 33. Similarly, the corresponding terminals of the lamp receptacles of the signal devices 3 and 4 are connected to each other by means of a conductor 34, while the remaining terminals of the lamp receptacles of such signal devices are grounded as at 35. The contact studs 23 and 24 of the hand operated switch are connected with the conductors 32 and 34 respectively by means of wires 36 and 37. The contact studs 9 and 10 of the automatic switch are connected, respectively, with the conductors 32 and 34 by means of branch conductors 38 and 39, while the contact segment 8 of the steering wheel controlled switch is connected by means of a conductor 40 with one terminal of the lamp receptacle of the signal device 1, and the remaining terminal of the receptacle of such device is grounded upon the frame of the vehicle as at 41.

In practice, when the vehicle is in service, the main controlling switch 30 is closed and when the driver of the vehicle is about to steer his machine to the right, and wishes to so notify pedestrians and the drivers of other vehicles, such driver actuates the switch lever 22 of the hand switch into engagement with the contact stud 24 thereby closing the circuit from the battery 27 through the lamp of the signal devices 3 and 4, current flowing from one side of the battery 27 through the conductor 29 to switch 30 the conductor 31 the hand operated switch the conductor 37, the conductor 34, the lamp of said signal devices, and back to the other side of the battery by way of the ground connection. On the other hand, when the driver of the vehicle is about to steer his machine to the left and desires to notify pedestrians and the operators of other vehicles, such operator actuates the switch lever 22 into engagement with the contact stud 23 thereby closing the circuit of the lamp of the signal devices 2 and 3' with the effect to energize such devices and so advise persons in the vicinity of the vehicle of the operator's intentions.

Should the lever of the hand switch remain in normal position and the operator of the vehicle actuate the steering wheel to turn the machine to the right, one of the rollers 19 on the arm 11 of the automatic switch will engage contact segment 10 thereby closing the circuit to the lamps of the signal devices 3 and 4, current flowing from the battery 27 through the conductor 29, the main switch 30, the conductors 32, the lever 11 of the hand switch, the particular roller on such arm 11 the contact segment 10, branch wire 39 and conductor 34 through the lamp of such signal devices and back to the other side of the battery by way of the ground connections. When the operator of the vehicle steers the latter to the left, one of the rollers 19 on the arm 11 of the automatic switch engages the contact segment 9 thereby closing the circuit to the lamp of the signal devices 2 and 3 to energize such devices. On the other hand, when the steering wheel of the vehicle is in normal position, that is, in a position to hold the front wheels in line with the back wheels so that the vehicle will travel a straight path, the other roller on the arm 11 of the steering wheel operated switch engages the contact segment 8 thereby closing the circuit of the signal device 1 at the forward end of the vehicle, current flowing from one side of the battery 27 to the conductor 29 to switch 30, the conductor 32, the arm 11 of the steering wheel controlled switch, the contact 8, conductor 40, the lamp of said signal device 1, and back to the other side of the battery by way of the ground connections.

While I have herein shown and described one preferred form of my invention, by way of illustration, I wish it to be understood that I do not limit or confine myself to the precise details of construction herein described and delineated, as modifications and variations may be made within the scope of the claims without departing from the spirit of the invention.

I claim:—

A steering wheel controlled switch for direction indicating apparatus for vehicles comprising a sleeve of insulating material surrounding the stationary tubular member of the steering column and secured thereto, an arm movable over said sleeve, connections between one end of said arm and the hub of the steering wheel, bearings carried by said arm and projecting toward said sleeve, a shaft journaled in said bearings, rollers mounted upon said shaft and spaced apart thereon, a contact segment on said sleeve normally engaged by one of said rollers, a contact segment on said sleeve at one end of the first-mentioned segment and adapted to be engaged by another of said rollers when the steering wheel is moved in one direction, and a contact segment on said sleeve at the opposite end of said first-mentioned segment and adapted to be engaged by another roller on said arm when the steering wheel is moved in the opposite direction.

In testimony whereof I affix my signature in presence of two witnesses.

PAUL R. HARSH.

Witnesses:
 CAMPBELL SMITH,
 J. R. WRIGHT.